M. L. ADDINGTON.
RETRIEVING MECHANISM FOR TROLLEY POLES.
APPLICATION FILED MAR. 3, 1908.
906,984.
Patented Dec. 15, 1908.
2 SHEETS—SHEET 1.
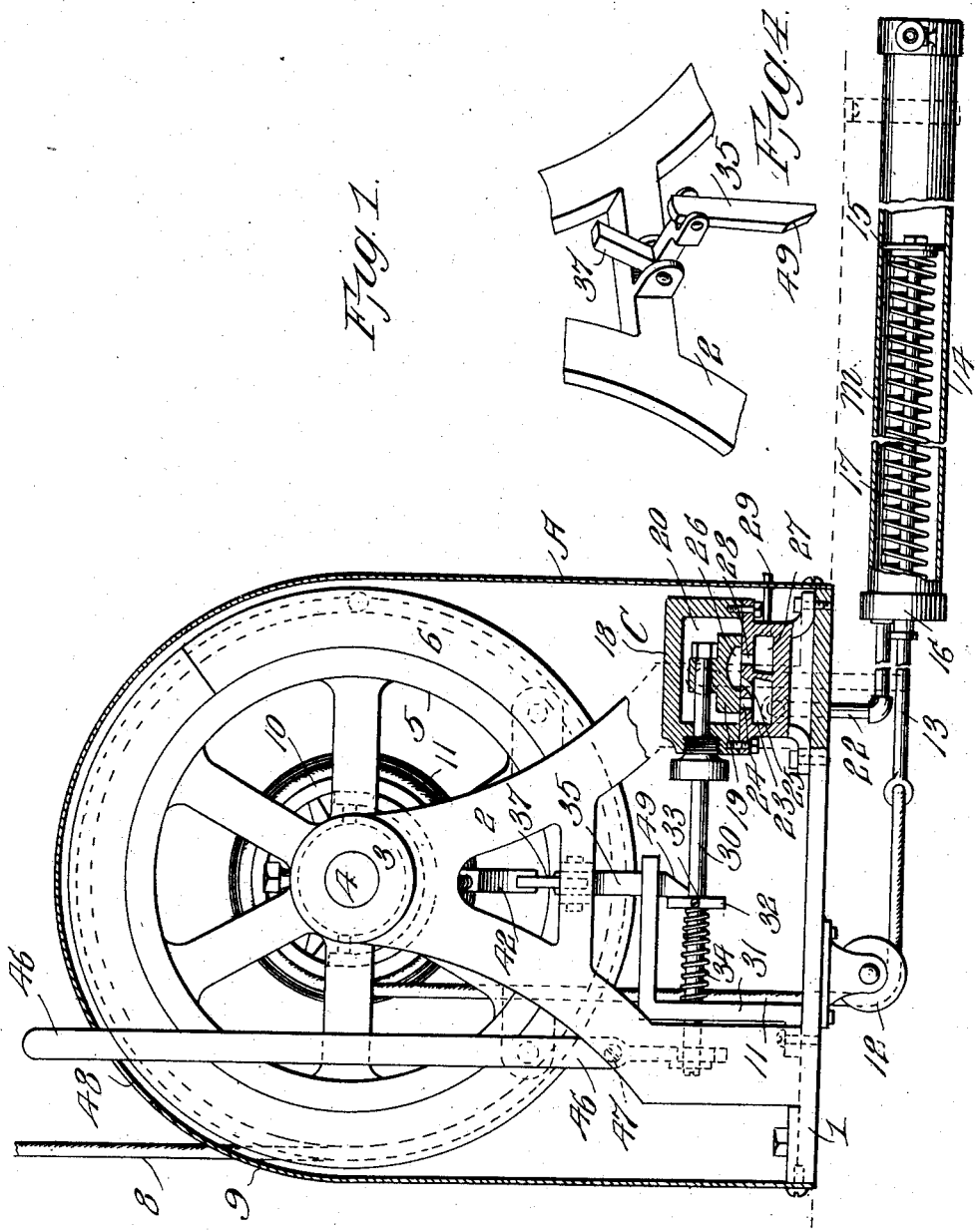
Witnesses
Frank Hough
C. Bradway.
Inventor
Martin L. Addington,
By Victor J. Evans
Attorney M. L. ADDINGTON.
RETRIEVING MECHANISM FOR TROLLEY POLES.
APPLICATION FILED MAR. 3, 1908.
906,984.
Patented Dec. 15, 1908.
2 SHEETS—SHEET 2.
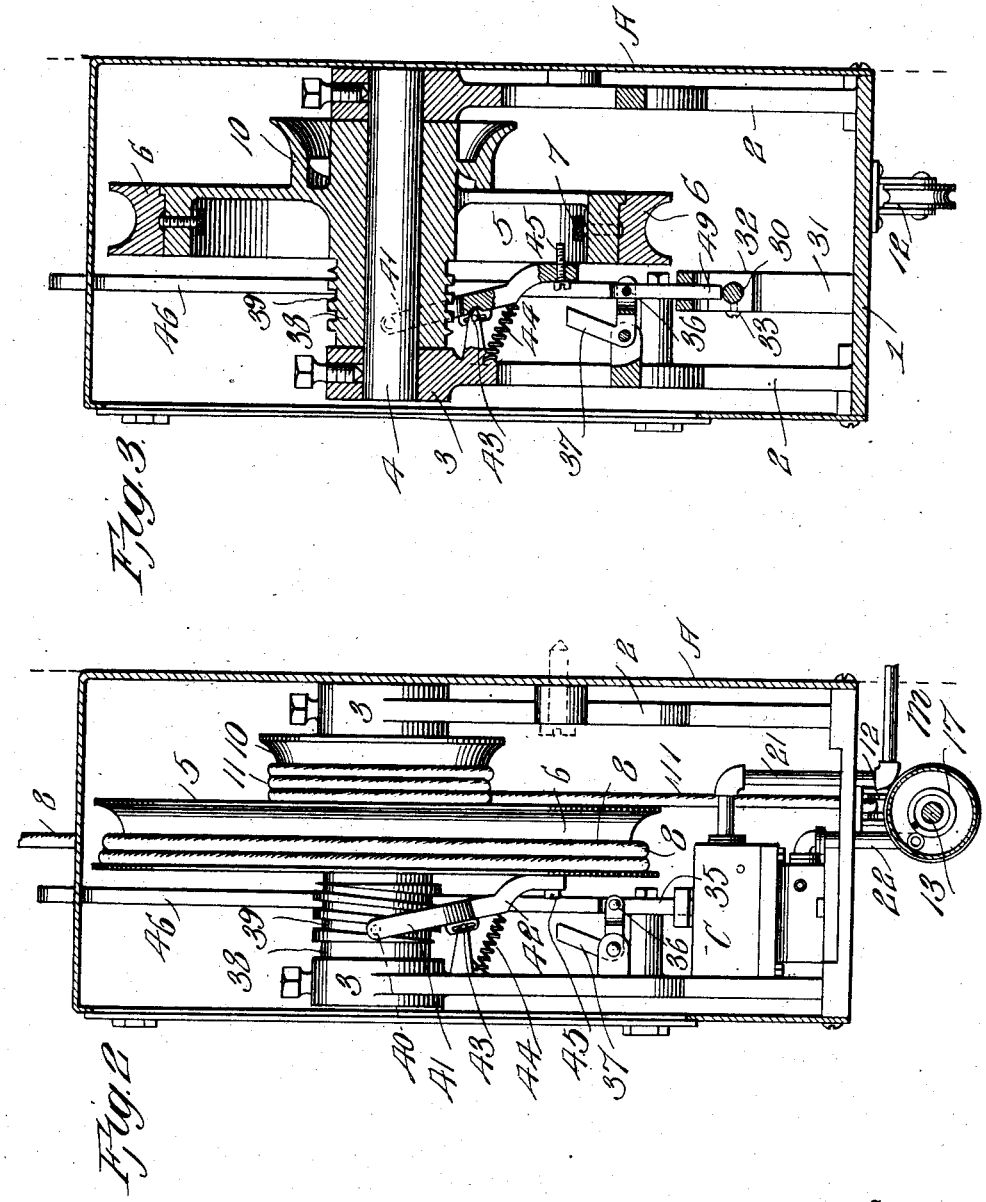
Witnesses
Frank Hough
E. Bradway
Inventor
Martin L. Addington,
By Victor J. Evans
Attorney

UNITED STATES PATENT OFFICE.

MARTIN L. ADDINGTON, OF INDIANAPOLIS, INDIANA, ASSIGNOR OF ONE-THIRD TO JOHN E. HAFNER, OF INDIANAPOLIS, INDIANA.

RETRIEVING MECHANISM FOR TROLLEY-POLES.

No. 906,984.　　　　　Specification of Letters Patent.　　　Patented Dec. 15, 1908.

Application filed March 3, 1908. Serial No. 419,011.

*To all whom it may concern:*

Be it known that I, MARTIN L. ADDINGTON, a citizen of the United States, residing at Indianapolis, in the county of Marion and State of Indiana, have invented new and useful Improvements in Retrieving Mechanism for Trolley-Poles, of which the following is a specification.

This invention relates to trolley pole retrieving mechanisms of that type which permits the trolley pole to rise and fall to predetermined limits to accommodate the pole to variations in the elevation of the overhead conductor, and which automatically retrieves the trolley pole in case the wheel leaves the trolley wire so as to prevent breakage of the cross wires supporting the trolley wire by the pole coming in contact therewith and to prevent damage to the trolley pole itself.

The invention has for one of its objects to improve and simplify the construction and operation of apparatus of this character so as to be comparatively easy and inexpensive to manufacture, thoroughly reliable and efficient in use, and readily controlled.

A further object of the invention is the provision of a retrieving mechanism including a pneumatic or other motor which is thrown automatically into operation when the trolley pole reaches a certain point in its upward movement upon jumping off the trolley wire.

Another object is to provide a controller or valve for the motor which is automatically thrown into operative position by the releasing of a latch when the trolley pole reaches a predetermined point in its upward movement.

As a further object, the invention contemplates the employment of a re-setting device whereby the attendants can readily re-set the valve after the pole has been lowered by the motor, the re-setting of the valve serving to exhaust the motor cylinder so that the attendant can re-place the trolley wheel on the overhead wire.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Figure 1 is a side view of the mechanism with parts in section. Fig. 2 is an end view of the mechanism with the casing in section. Fig. 3 is a central vertical section. Fig. 4 is a detail perspective view of the latch for the valve re-setting mechanism.

Similar reference characters are employed to designate corresponding parts throughout the several views.

Referring to the drawings, A designates the casing of the apparatus which is attached to a base plate 1 from which rise brackets 2. These brackets are formed with bearings 3 for the axle 4 on which the wheel 5 is mounted. The wheel is formed with a split felly 6 secured in place by set screws 7 which can be adjusted for varying the diameter of the wheel to suit the requirements, and secured to the wheel in any suitable manner is the rope 8 which is attached to the trolley pole, as will be readily understood. The rope passes upwardly through an opening 9 in the casing A and the wheel is adapted to freely rotate back and forth to take up the slack in the rope or play out the latter as the trolley pole rises and falls with the changing in elevation of the trolley wire. Formed on the hub of the wheel is a drum 10 of smaller diameter than the wheel and fastened thereto is a flexible element 11 that passes downwardly through the base plate and is guided over a pulley 12 that connects with the piston rod 13 of the motor $m$, there being a constant draft on the flexible element 11 in a direction opposite to that on the trolley rope, by reason of the spring 17.

The motor $m$ in the present instance, is preferably designed to be operated by air under pressure and the same consists of a cylinder 14 in which reciprocates a piston 15, mounted on the rod 13 that passes through the head 16 of the cylinder. Between the head 16 and piston 15 and bearing on each is the helical spring 17 which serves to maintain a draft on the flexible element 11. This spring, however, is of considerably less tension than the erectile spring, of the trolley pole so that as the pole rises, the spring 17 will yield and permit the unwinding of the rope 8. The casing A and motor m may be mounted on the dash or other suitable part of the car and the motor is adapted to be actuated by compressed air from a suitable source, such for instance, as the reservoir of the air brake system.

The supply of motive fluid to the motor cylinder and the exhaust of the fluid therefrom are controlled by a valve device C, the same comprising a valve chest 18 in which is a slide valve 19. The chamber 20 of the valve chest is connected with the source of supply by a pipe 21 and fluid is conducted to the motor cylinder through a pipe 22 which communicates with the chamber 23 of the valve chest, and air is admitted to the chamber 23 through a port 24 which is normally covered by the slide valve. In exhausting the motor, the fluid entering the chamber 23 from the pipe 22 passes through a port 25 in the wall of said chamber and thence through the port 26 of the valve which directs the steam into the chamber 27 through the port 28, and this chamber exhausts into the atmosphere in any suitable manner, as for instance, by a pipe 29. The valve 19 is secured to a rod 30 which passes outwardly through the wall of the air chest and has its outer end mounted in a bearing bracket 31 supported on the base-plate 1. On the rod is an adjustable clutch 32 secured in position by a set screw 33, and interposed between and bearing on the bracket and catch is a helical compression spring 34 which tends to throw the valve to open position. Arranged to normally engage the catch is a latch 35 that is pivotally mounted at 36 on a bell crank lever or trigger 37 that is in turn fulcrumed on the front bracket 2. When the catch is thus engaged, the valve rod is held in such a position as to cut off the supply of fluid to the motor and to hold the actuating spring 34 under compression. Upon releasing of the latch 35, the spring 34 immediately expands and throws the valve to open position so as to admit the operating fluid to the motor.

The trigger is adapted to be released automatically when the trolley pole reaches a predetermined point in its upward movement upon the wheel leaving the trolley wire, and for this purpose, the unwinding movement of the wheel 5 is utilized. On the wheel is a hub extension 38 which is provided with a spiral groove 39 into which engage, at diametrically opposite points, pins 40 on the extremities of bifurcations 41 of the trigger-releasing lever 42. This lever is fulcrumed at 43 on the front bracket 2 and is provided with a spring 44. The lower end of the lever 42 has a screw 45 which is adapted to engage the upper end of the trigger 37, and this screw is adjusted to effect engagement with the trigger at the proper time. As the wheel 5 rotates in a clockwise direction, as when the trolley wheel jumps off the trolley wire, the lever 42 is tilted by the pins traveling in the groove 39 so that the lower end of the lever will engage the trigger and cause the valve device to be opened when the trolley pole reaches a predetermined point. In case the pin should pass out of the groove, the spring 44 will maintain the lever in such a position that the pins will immediately reënter the groove upon the wheel rotating in reverse direction.

After the trigger has been released and the valve opened to supply the operating fluid to the motor so as to retrieve the trolley pole, the supply of fluid is cut off by re-setting the valve and this is accomplished by means of the lever 46 which is fulcrumed at 47 on the front bracket and is connected with the extremity of the valve rod 30, the lever 46 having its upper end extended through an opening 48 in the casing A so that the conductor or attendant can actuate the lever. In resetting the valve, the lever 8 is moved to the right so as to thereby move the valve rod 30 to the left, and during the movement of the latter, the catch 23 passes under the latch 25 which latter is beveled at 49 so as to permit the catch to ride freely under the same. As soon as the catch passes the latch, the latter drops by its own weight behind the catch and this holds the valve in closed position, as shown in Fig. 1.

The parts of the apparatus are normally in the position shown in the figures of the drawing, and the trolley pole is free to move up and down within normal limits, the piston 15 moving freely back and forth so as to maintain the trolley rope 8 taut at all times. In the event of the trolley wheel leaving the trolley wire, the wheel 5 will rotate in a clockwise direction and thereby cause the trigger-actuating lever 34 to approach the trigger and finally release the same when a predetermined point has been reached in the upward movement of the trolley pole. Upon releasing of the trigger, the latch 35 disengages the catch 32 so that the spring 34 will immediately move the valve rod 30 to the right, thereby causing the valve 19 to uncover the port 24 and close the port 23. Compressed air is thus admitted from the chamber 20 to the chamber 23 through the port 24, and is thus supplied to the motor cylinder to act on the forward side of the piston therein. The piston is thus moved to the right, Fig. 1, and unwinds the flexible element 11 from the drum 10, whereby the latter rotates the wheel 5 in an anti-clockwise direction for the purpose of winding the trolley rope 8. The trolley pole is consequently lowered to a point below the cross wires of the overhead construction so that the danger of breaking the cross wires is overcome. In order to enable the wheel to be replaced on the trolley wire, the conductor grips the trolley rope 8 so as to prevent the trolley pole from flying upwardly under the action of its erectile spring and at the same time the re-setting lever 46 is actuated for returning the valve to normal position. By this operation, the fluid in the motor cylinder is permitted to escape through the pipe 22, chamber 23, ports 24, 26 and 28, chamber 27, and exhaust pipe 29. The conductor can then permit the trolley pole to rise under the action of the erectile spring thereof and thus guide the wheel back to the trolley wire.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. In a retrieving mechanism, the combination of a wheel for the trolley rope a drum connected therewith a flexible element wound on the drum, a take-up spring for maintaining the element taut as the wheel oscillates, a motor connected with the element to produce a draft thereon, a valve for controlling the admission and exhaust of fluid to and from the motor, means tending to open the valve, a trigger device for holding the valve closed, and a manually-operated re-setting device for the valve.

2. In a retrieving mechanism, the combination of a rotary element, separate cords attached thereto to simultaneously wind and unwind respectively, a motor connected with one of the cords, a valve device for the motor, means for automatically actuating the device to admit fluid to the motor, a casing for the mechanism, and a manually-actuated member connected with the said device for re-setting the latter and extending out of the casing.

3. In a retrieving mechanism, the combination of a wheel, a trolley pole rope arranged to wind thereon, a drum attached to the wheel, a flexible element arranged on the drum to unwind while the said rope winds, a motor attached to the element, a spring-actuated member controlling the motor, a trigger device arranged to hold the member in set position, an automatic means for releasing the trigger device when the unwinding of the said rope reaches a predetermined point.

4. In a retrieving mechanism, the combination of a rotary member, flexible elements connected therewith and arranged to wind around the same, a motor connected with one of the elements, a controlling means for the motor including a rod, a spring acting on the rod, a latch device for holding the rod in set position against the tension of the spring, means controlled by the rotation of the said member for releasing the latch device, and manually-operated means for re-setting the controlling means and permitting the latch device to automatically lock the said rod.

5. In a retrieving mechanism, the combination of a trolley pole rope, an element for retrieving the same, a motor for actuating the element, a controller for the motor including a spring-actuated rod, a catch on the rod, a latch arranged to engage the catch, a trigger connected with the latch, and means controlled by the movement of the said element for actuating the trigger.

6. In a retrieving mechanism, the combination of a trolley pole rope, an element for retrieving the same, a motor for actuating the element, a controller for the motor including a spring-actuated rod, a catch on the rod, a latch arranged to engage the catch, a trigger connected with the latch, means controlled by the movement of the said element for actuating the trigger, and a lever connected with the rod for re-setting the controller.

7. The combination of a trolley pole rope, a wheel on which the same winds, a drum connected with the wheel, a flexible element connected with the drum and arranged to wind during the unwinding of the said rope, a member connected with the wheel and having a spiral groove, a trigger-actuating lever engaging in the groove to be moved thereby, a motor connected with the said flexible element, a controlling means for the motor, and a trigger device actuated by the said lever for operating the controlling means.

8. The combination of a trolley pole rope, a wheel on which the same winds, a drum connected with the wheel, a flexible element connected with the drum and arranged to wind during the unwinding of the said rope, a motor connected with the element, a controlling device for the motor including a reciprocatory rod, a spring for moving the rod in one direction, a re-setting lever connected with the rod for moving it in the opposite direction, a latch mounted to gravitate to locking position for holding the rod set against the tension of the spring, a trigger connected with the latch for releasing the same, and means controlled by the movement of the said wheel for actuating the trigger.

9. The combination of a motor, a valve controlling the admission and exhaust of fluid to and from the motor, a flexible element connected with the motor, a rod connected with the valve, a support for the rod, a collar on the rod forming a catch, a spring disposed between the support and collar, a latch arranged to engage the catch and mounted to gravitate to engaging position, a member pivotally connected with and supporting the latch, a spring-actuated lever movable into and out of engagement with the said member, a rotary element for operating the said lever, and a manually-actuated resetting device connected with the rod.

In testimony whereof I affix my signature in presence of two witnesses.

MARTIN L. ADDINGTON.

Witnesses:
OTTIE N. SHIRLEY,
W. A. FOLKERTH.